United States Patent
Nagata (10) Patent No.: US 9,959,838 B2
(45) Date of Patent: May 1, 2018

(54) TRANSPARENT DISPLAY OVERLAY SYSTEMS FOR VEHICLE INSTRUMENT CLUSTER ASSEMBLIES

(71) Applicant: Toyota Motor Engineering & Manufacturing North America, Inc., Erlanger, KY (US)

(72) Inventor: Katsumi Nagata, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 245 days.

(21) Appl. No.: 14/220,392

(22) Filed: Mar. 20, 2014

(65) Prior Publication Data

US 2015/0268465 A1   Sep. 24, 2015

(51) Int. Cl.
| | | |
|---|---|---|
| *G09G 5/12* | (2006.01) | |
| *G06F 3/14* | (2006.01) | |
| *B60K 35/00* | (2006.01) | |
| *B60K 37/02* | (2006.01) | |

(52) U.S. Cl.
CPC .............. *G09G 5/12* (2013.01); *B60K 35/00* (2013.01); *B60K 37/02* (2013.01); *G06F 3/1423* (2013.01); *B60K 2350/2017* (2013.01); *B60K 2350/2056* (2013.01); *B60K 2350/2086* (2013.01); *G09G 2300/04* (2013.01); *G09G 2380/10* (2013.01)

(58) Field of Classification Search
CPC .... B60K 2350/2086; B60K 2350/2056; B60K 37/02; B60K 2350/2017; B60K 35/00; G09G 5/12; G09G 2380/10; G09G 2300/04; G06F 3/1423; G02B 2027/0196; G02B 27/0101

See application file for complete search history.

(56) References Cited

U.S. PATENT DOCUMENTS

| | | | |
|---|---|---|---|
| 6,181,301 B1 * | 1/2001 | Inoguchi | B60K 37/02 345/4 |
| 6,542,146 B1 * | 4/2003 | Toffolo | B60K 37/02 340/438 |
| 6,600,527 B1 | 7/2003 | Basturk et al. | |
| 7,924,362 B2 | 4/2011 | Slobodin | |
| 2008/0040004 A1 * | 2/2008 | Breed | B60R 21/0134 701/45 |
| 2008/0211779 A1 * | 9/2008 | Pryor | G01C 21/3664 345/173 |
| 2010/0097293 A1 | 4/2010 | McMahon | |

(Continued)

FOREIGN PATENT DOCUMENTS

EP    1417460    10/2009

*Primary Examiner* — Abhishek Sarma
(74) *Attorney, Agent, or Firm* — Dinsmore & Shohl LLP (57) ABSTRACT

An instrument cluster assembly for a vehicle includes a vehicle instrument that is viewable by an occupant of the vehicle. A transparent protective cover covers the vehicle instrument such that the vehicle instrument is viewable by the occupant through the transparent protective cover. A transparent display overlay system includes an overlay display comprising a transparent display layer connected to the transparent protective cover by an optical adhesive layer. A display controller displays an image on the transparent display layer based on vehicle information. The vehicle instrument is viewable by the occupant through the transparent protective cover and the transparent display layer adjacent the image.

20 Claims, 6 Drawing Sheets

(56) References Cited

U.S. PATENT DOCUMENTS

2010/0102945 A1* 4/2010 Watson .................. B60K 35/00
                340/462
2010/0194767 A1  8/2010 Dixon
2010/0253539 A1* 10/2010 Seder .................... G01S 13/723
                340/903
2010/0253540 A1* 10/2010 Seder ........................ B60R 1/00
                340/905

* cited by examiner

| Warning light | Warning light/Details |
|---|---|
| BRAKE (U.S.A.) <br> ⊙ (Canada) | Brake system warning light (warning buzzer) <br> • Low brake fluid <br> • Malfunction in the brake system |
| 🔋 | Charging system warning light <br> Indicates a malfunction in the vehicle's charging system. |
| 🛢️ | Low engine oil pressure warning light <br> Indicates that the engine oil pressure is too low. |
| Type A <br> [≜C ❄] <br> Type B <br> [≜C 🌡H] | High engine coolant temperature warning light <br> Indicates that the engine is almost overheating. |
| CHECK (U.S.A.) <br> ⚙ (Canada) | Malfunction indicator lamp <br> Indicates a malfunction in: <br> • The electronic engine control system; or <br> • The electronic throttle control system; or <br> • The electronic automatic transmission control system. |

FIG. 6A

| Warning light | Warning light/Details |
|---|---|
|  | SRS warning light<br>Indicates a malfunction in:<br>• The SRS airbag system; or<br>• The front passenger occupant classification system; or<br>• The seat belt pretensioner system. |
| ABS<br>(U.S.A.)<br><br>(Canada) | ABS warning light<br>Indicates a malfunction in:<br>• The ABS; or<br>• The brake assist system. |
|  | Cruise control indicator light<br>Indicates a malfunction in the cruise control system. |
|  | Slip indicator light<br>Indicates a malfunction in:<br>• VSC system; or<br>• TRACt system. |
|  | Electric power steering system warning light (warning buzzer)<br>Indicates a malfunction in the EPS system. |
| BSM<br>(Comes on) | BSM warning light<br>Indicates a malfunction in the Blind Spot Monitor. |
|  | Smart key system indicator light<br>Indicates a malfunction in the smart key system. |

FIG. 6B

| Warning light | Warning light/Details |
|---|---|
|  | Open door warning light (warning buzzer)<br>Indicates that a door or the trunk is not fully closed. |
|  | Low fuel level warning light<br>Indicates remaining fuel is approximately 2.6 gal.<br>(9.7 L, 2.1 Imp. gal.) or less. |
|  | Driver's/front passenger's seat belt reminder light (warning buzzer)<br>Warns the driver/front passenger to fasten his/her seat belt. |
|  | Low windshield washer fluid warning light<br>Low level of washer fluid. |
| <br>(U.S.A. only) | Maintenance required reminder light<br>Indicates that maintenance is required according to the driven distance on the maintenance schedule |
| <br>(U.S.A. only) | Tire pressure warning light<br>When the light comes on:<br>Low tire inflation pressure such as<br>• Natural causes<br>• Flat tire |

FIG. 6C

TRANSPARENT DISPLAY OVERLAY SYSTEMS FOR VEHICLE INSTRUMENT CLUSTER ASSEMBLIES

TECHNICAL FIELD

The present specification generally relates to vehicle display systems and, more particularly, to transparent display overlay systems for vehicle instrument cluster assemblies.

BACKGROUND

Modern automotive vehicles typically employ instrument panel assemblies including instrument cluster assemblies having various vehicle instruments such as fuel gauges, speedometers, tachometers, and odometers. The instrument cluster assemblies may also have a variety of indicator symbols that are indicative of certain operating conditions, such as warnings and alerts. In some instances, drivers may need to consult an operation manual for the vehicle to determine what a particular indicator symbol or other displayed information means. This can involve stopping the vehicle at a suitable location and consulting the operator manual. What is desired is a transparent display overlay system that overlays the instrument cluster assembly, which can supplement the information provided by the instrument cluster system.

SUMMARY

In one embodiment, an instrument cluster assembly for a vehicle includes a vehicle instrument that is viewable by an occupant of the vehicle. A transparent protective cover covers the vehicle instrument such that the vehicle instrument is viewable by the occupant through the transparent protective cover. A transparent display overlay system includes an overlay display comprising a transparent display layer connected to the transparent protective cover by an optical adhesive layer. A display controller displays an image on the transparent display layer based on vehicle information. The vehicle instrument is viewable by the occupant through the transparent protective cover and the transparent display layer adjacent the image.

In another embodiment, a method of displaying vehicle information to an occupant of a vehicle is provided. The method includes providing general indicator information to the occupant of the vehicle using an instrument cluster of an instrument cluster assembly. The instrument cluster includes a vehicle instrument and a transparent protective cover covering the vehicle instrument such that the vehicle instrument is viewable though the transparent protective cover. Specific indicator information is provided as part of an image associated with the general indicator information to the occupant of the vehicle using an overlay display of a transparent display overlay system. The overlay display includes a transparent display layer connected to the transparent protective cover by an optical adhesive layer.

In another embodiment, a method of forming an instrument cluster assembly for a vehicle is provided. The method includes affixing a transparent display layer of an overlay display to a transparent protective cover with an optical adhesive. The transparent protective cover is connected to an instrument cluster thereby covering a vehicle instrument of the instrument cluster. The transparent display layer is spaced from the vehicle instrument in a vehicle lengthwise direction. The vehicle instrument is viewable through the transparent protective cover and the transparent display layer with the transparent protective cover connected to the instrument cluster.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to transparent display overlay systems for vehicle instrument cluster assemblies. The transparent display overlay systems include an overlay display having at least one transparent display layer that overlays a vehicle instrument cluster assembly, allowing an operator to view the vehicle instruments through the transparent display layer. The overlay display including the transparent display layer may be connected directly to a protective cover that shields one or more vehicle instruments of the vehicle instrument cluster assembly. The transparent display overly systems can supplement information provided by the instrument cluster assembly while allowing viewing of the vehicle instruments therebehind.

Figure 1:
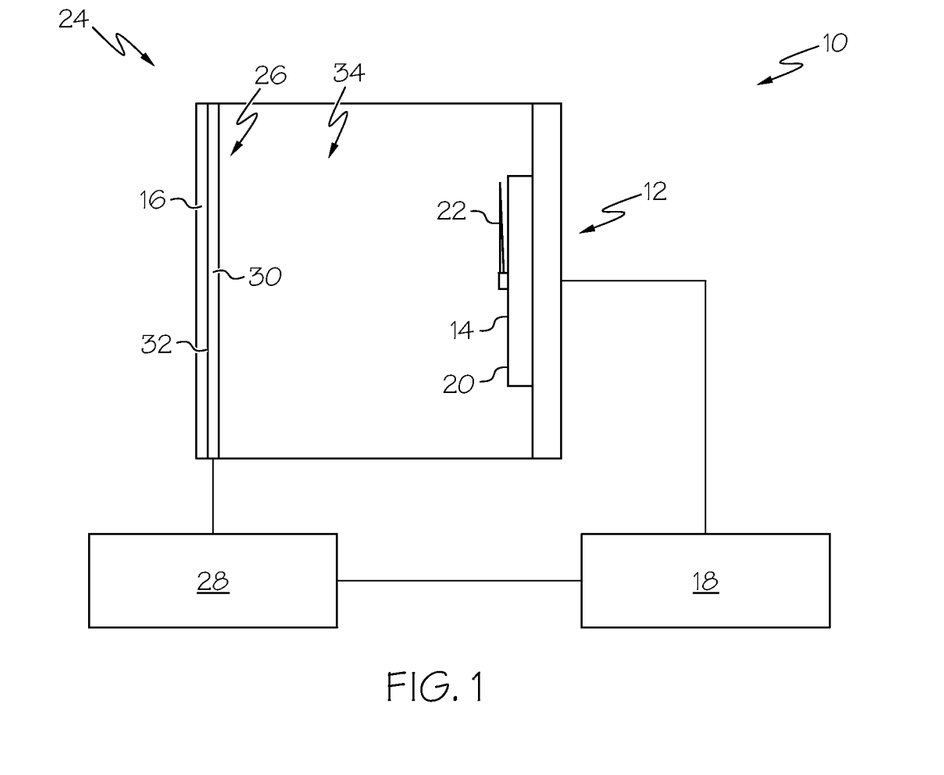
FIG. 1 is a diagrammatic, side view of an instrument cluster assembly with a transparent display overlay system according to one or more embodiments described herein.

Referring to FIG. 1, a diagrammatic view of an instrument cluster assembly 10 includes an instrument cluster 12 of various vehicle instruments 14, such as a tachometer, speedometer, odometer, fuel gauge, coolant temperature gauge, warning or alert lamps, etc. The vehicle instruments 14 may be analog and/or digital. A transparent protective cover 16 may be used to enclose one or more of the vehicle instruments 14 and provide a protective shield for the vehicle instruments 14 from the surrounding environment. A diagnostic controller 18 (e.g., as part of an ECU) may be connected to one or more of the vehicle instruments 14 for controlling their operation, for example, in response to various inputs from a variety of vehicle sensors.

Figure 2:
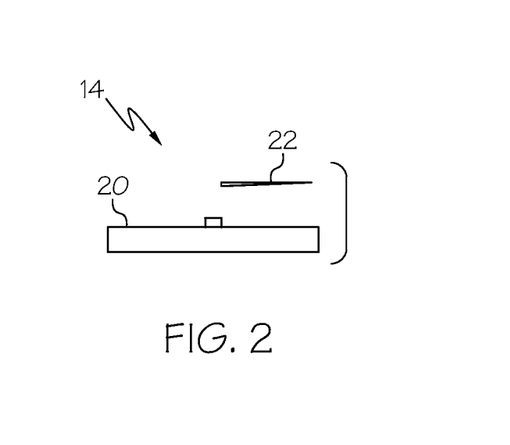
FIG. 2 is a diagrammatic, side view of a vehicle instrument for use with the instrument cluster assembly of FIG. 1 according to one or more embodiments described herein.

Referring briefly to FIG. 2, an exemplary vehicle instrument 14 is illustrated diagrammatically. The exemplary vehicle instrument 14 may include a display panel 20 with, for example, a series of gradation marks (e.g., miles per hour, kilometers per hour, revolutions per minute, gallons, liters, miles, kilometers, etc.), warning lamps, digital displays, etc. for supplying vehicle information to an operator. As used herein, "display panel" is meant to refer to a panel or surface on or through which vehicle information is initially provided. In the case of an analog vehicle instrument 14, a needle 22 may be rotatably or otherwise movably mounted to the display panel 20 along the gradation marks to provide vehicle information to the operator.

Referring again to FIG. 1, a transparent display overlay system 24 includes an overlay display 26 and a display controller 28 (e.g., as part of an ECU). The overlay display 26 includes a single transparent display layer 30 that is connected directly to the transparent protective cover 16 using, for example, an optical adhesive layer 32. In other embodiments, multiple transparent display layers 30 may be used with the overlay display 26 for separately displaying information. The overlay display 26 may extend over all or only a part of the viewable area of the transparent protective cover 16. Additionally, multiple displays with transparent display layers may be provided at different locations on the viewable area of the transparent cover 16. Where multiple displays and/or transparent display layers are used, one or more may be individually and/or collectively controlled with one or more display controllers. The display controller 28 may also communicate with the diagnostic controller 18 and receive information therefrom for use in determining displaying information for the overlay display 26. In some embodiments, the display and diagnostic controllers 28 and 18 may be part of the same controller.

In the embodiment of FIG. 1, the overlay display 26 and transparent display layer 30 are spaced from the display panel 20 of the vehicle instruments 14, providing a gap 34 therebetween. Thus, in the vehicle lengthwise direction, the vehicle instruments 14 may be referred to as a forward display and the overlay display 26 may be referred to as a rearward display that is spaced-apart in the vehicle lengthwise direction from and overlaps the forward display. In this fashion, the display layer 28 is configured to be transparent to allow viewing of the vehicle instruments 14, even while being used to display an object. As used herein, the term "transparent" refers to a transparent or semi-transparent material that allows viewing therethrough of the vehicle instruments 14 by an operator having normal vision (20/20 vision) in a readable fashion.

Figure 3:
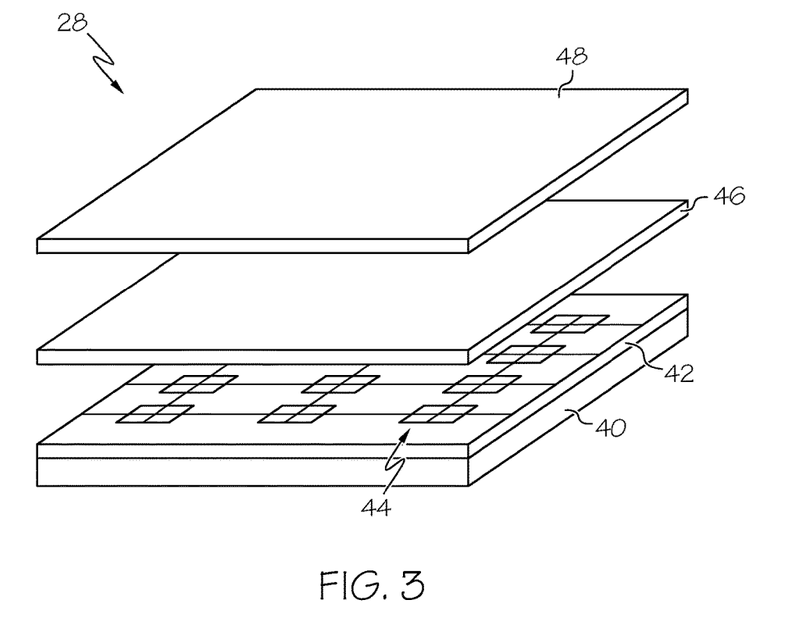
FIG. 3 is a diagrammatic, perspective view of a transparent display layer for use with the transparent display overlay system of FIG. 1 according to one or more embodiments described herein.

Referring to FIG. 3, a suitable transparent display layer 28 may be an active matrix organic emitting diode (AMOLED) type transparent display layer. The AMOLED display layer 28 may include a transparent substrate layer 40, a transparent transistor layer 42 and TFT array 44, an organic active layer 46 and a transparent cathode layer 48. In some embodiments, the TFT array 44 may be integrated into the transparent substrate layer 40. In some embodiments where touch function or a touch screen is desired, a touch digitizer layer may be used, such as a capacitive sensing digitizer layer. The touch digitizer layer may be transparent (e.g., using indium tin oxide) and may be integrated into the organic active layer 46. Other exemplary transparent display layers may include transparent liquid crystal displays (LCDs) and transparent thin-film electroluminescent (TFEL) displays.

Figure 4:
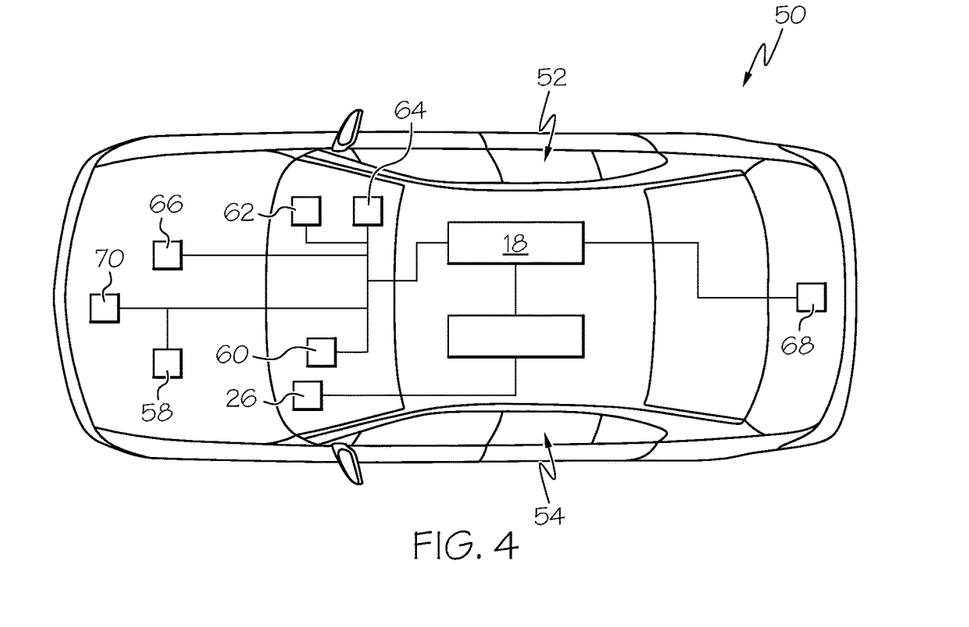
FIG. 4 is a diagrammatic, top view of a vehicle including a vehicle diagnostic system and a vehicle display system according to one or more embodiments described herein.

Referring to FIG. 4, a vehicle 50 includes a vehicle diagnostic system 52 and a vehicle display system 54 that uses the transparent display overlay system 24. The vehicle diagnostic system 52 is used to monitor conditions throughout the vehicle 50 and includes the diagnostic controller 18 that receives inputs from a number of sensors (e.g., sensor 58) located at various locations on the vehicle 50. The term "sensor" generally refers to a device that provides a signal in response to a stimulus. Exemplary sensors may include airbag sensors, chemical sensors, stress or strain sensors, pressure sensors, load sensors, magnetic sensors, coolant thermometers, oil pressure sensors, oil level sensors, air flow meters, brake pressure sensors, tire pressure sensors, GPS receivers, and coolant pressure sensors, to name a few.

The vehicle 50 includes numerous sensors as part of the vehicle diagnostic system 52. For example, sensor 58 may be a deceleration sensor that is part of an anti-lock brake system (ABS). While sensor 58 may be associated with the ABS system, it should be noted that any of the sensors discussed herein may be associated with more than one vehicle system. For example, sensor 58 may be used by vehicle systems other than the ABS system. Sensor 60 may be a steering wheel position sensor that is part of an active steering system. Sensors 62 and 64 may be room temperature and humidity sensors, respectively, that are part of an air conditioning system. Sensor 66 may be an engine coolant temperature sensor, which may also be used by the air conditioning system. Sensor 68 may be a back door position switch, which can be used to detect the back door in an open position. Sensor 70 may be a voltage sensor that detects battery voltage. Other exemplary sensors include crash sensors, chemical sensors, electric field sensors, vapor sensors, stress sensors, strain sensors, pressure sensors, weight sensors, thermometers, oil pressure sensor, oil level sensors, air flow meters, throttle position sensors, velocity sensors, wheel speed sensors, angular sensors, etc.

The various sensors can provide signals to the diagnostic controller 18 that are indicative of vehicle conditions, vehicle systems and/or components of the vehicle 10. In some instances, the diagnostic controller 18 may determine, based on the inputs from the sensors that one or more vehicle systems are operating normally. In other instances, the diagnostic controller 18 may determine, based on the inputs from the sensors that one or more vehicle systems are operating abnormally. In these instances, the diagnostic controller 18 may analyze the outputs from the sensors to determine the abnormal operation of a vehicle component and/or system. For example, the diagnostic controller 18 may determine whether the inputs from one or more of the sensors fall outside a predetermined range or threshold value saved in memory. This determination may be used by the diagnostic controller 18 to alert an occupant of the vehicle 10, such as the driver. Accordingly, an output or warning information may be provided by the diagnostic controller 18 to the display controller 28 for use in controlling the overlay display 26.

Figure 5:
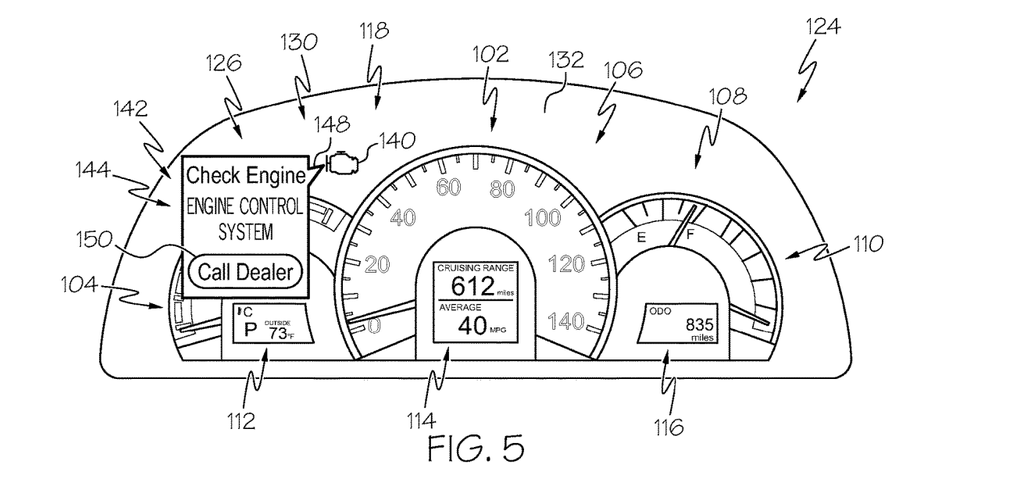
FIG. 5 is a front view of an exemplary instrument cluster assembly including a transparent display overlay system according to one or more embodiments described herein.

Referring to FIG. 5, an exemplary instrument cluster assembly 100 includes an instrument cluster 102 of various vehicle instruments including a tachometer 104 that displays engine speed in revolutions per minute, a speedometer 106 that displays vehicle speed, a fuel gauge 108 that displays a quantity of fuel remaining in a fuel tank of the vehicle and a miles per gallon gauge 110 that displays a current fuel economy of the vehicle. Multi-information displays 112, 114 and 116 may be provided in display panel 118 that can display a variety of information, such as outside temperature, engine coolant temperature, compass, gear, trip information, fuel economy, cruising range, tire pressure, warning messages, etc. The multi-information displays 112, 114 and 116 may be of any suitable display types, such as LCD, TFEL and/or OLED.

As described above, a transparent display overlay system 124 includes an overlay display 126 with a transparent display layer 130 that is connected directly to a transparent protective cover 132 of the instrument cluster assembly 100 using an optical adhesive layer (FIG. 1). In the illustrated embodiment, the transparent display layer 130 covers substantially the entire interior (or front-facing) surface area of the transparent protective cover 132. In other embodiments, the transparent display layer 130 may cover less than the entire interior surface area of the transparent protective cover 132, such as at least about 10 percent, such as at least about 25 percent, such as at least about 50 percent, such as at least about 75 percent of the entire interior surface area of the transparent protective cover 132.

As shown in FIG. 5, a check engine warning indicator lamp 140 (sometimes referred to as a malfunction indicator lamp) is illuminated on the display panel 118. While illumination of the check engine warning indicator lamp 140 can provide an indication of a general engine condition, not much specific warning information, if any, is provided by the check engine warning indicator lamp 140. For example, the check engine warning indicator lamp 140 can be a malfunction in any one or more of the electronic engine control system, the electronic throttle control system and the electronic automatic transmission control system. To even know this, an operator could typically consult an operator manual for the vehicle, which can be time-consuming.

Figure 6A:
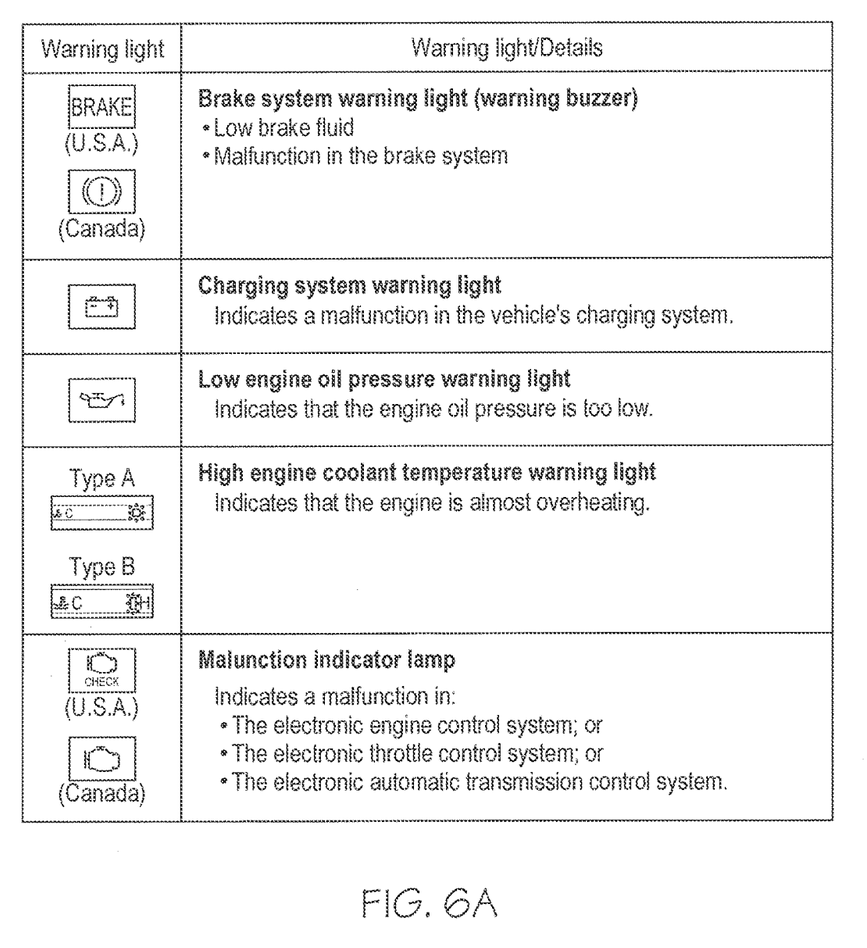
FIGS. 6A-6C illustrate an exemplary list of warning and other indicators and their associated specific indicator information that may be displayed using the transparent display overlay system of FIG. 1 according to one or more embodiments described herein.
Figure 6B:
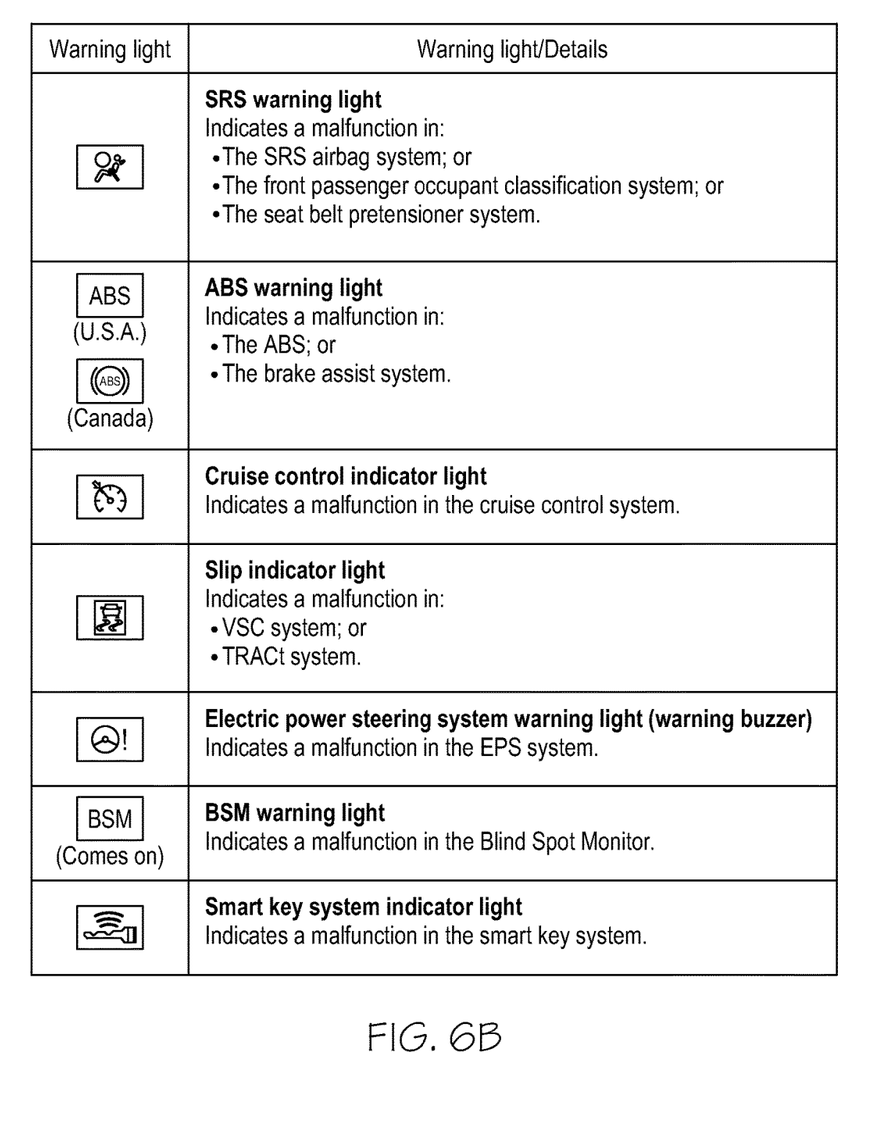
Figure 6C:
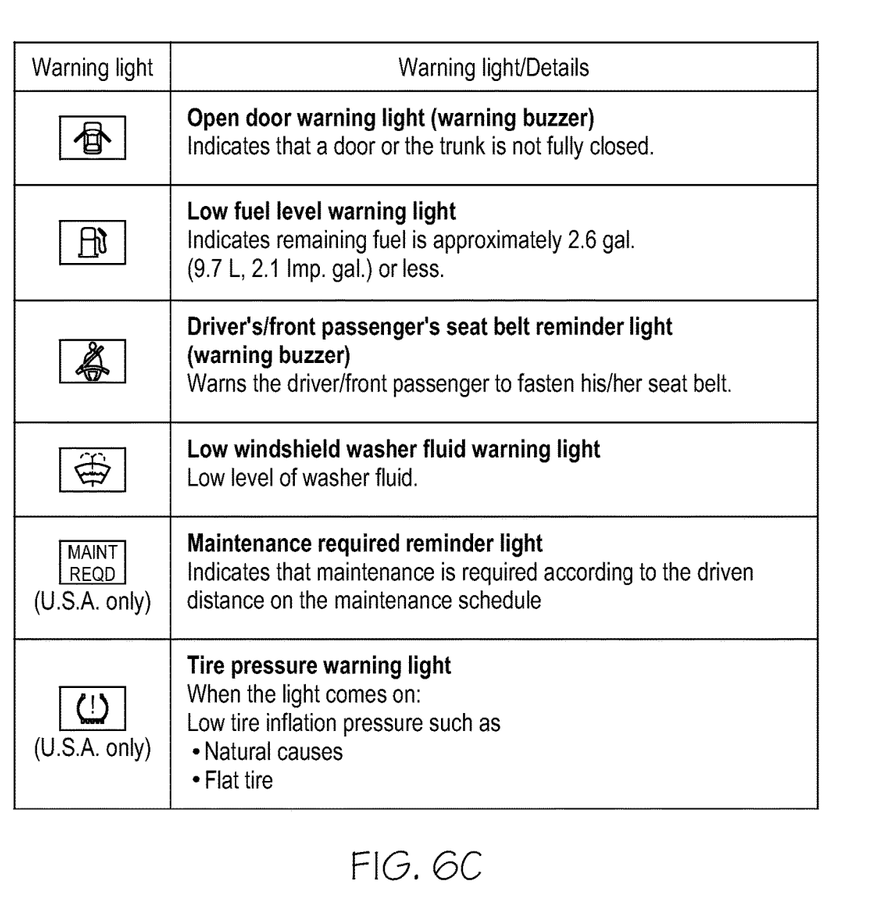

A display controller (FIG. 1) controls operation of the overlay display 126, for example, based on information received from a diagnostic controller or other source. Knowing the specific indicator information (e.g., provided by the diagnostic controller), the display controller can generate an image 142 using the overlay display 126 containing the specific indicator information 144 that supplements the general warning information provided by the check engine warning indicator lamp 140. Because the display layer 130 is transparent, the instrument cluster 102 can be seen through the transparent protective cover 132 in areas adjacent the image 142. In some embodiments, the image may be only partially transparent or translucent to allow some viewing of the instrument cluster 102 through the image 142. While the check engine warning indicator lamp 140 is illustrated, other warning lamps and associated specific indicator information may be displayed. FIGS. 6A-6C illustrate an exemplary list of warning and other indicators and their associated specific indicator information that may be displayed using the transparent display overlay system 124. This list is exemplary and not meant to be exhaustive.

In some embodiments, the image 142 may include information in addition to the specific indicator information 144. For example, the image 142 may be in the form of a word balloon having a directional indicator 148 that points toward the check engine warning lamp 140 to provide a visual association between the image 142 and the check engine warning lamp 140. In some embodiments, the overlay display 126 may have touch screen function. In these embodiments, the image 142 (or a separate image) may be provided with a selectable menu option or button 150, such as "Call Dealer." A telematics unit or separate cell phone paired with the vehicle may be then used to automatically connect to, for example, a technician at a dealership.

Figure 7:
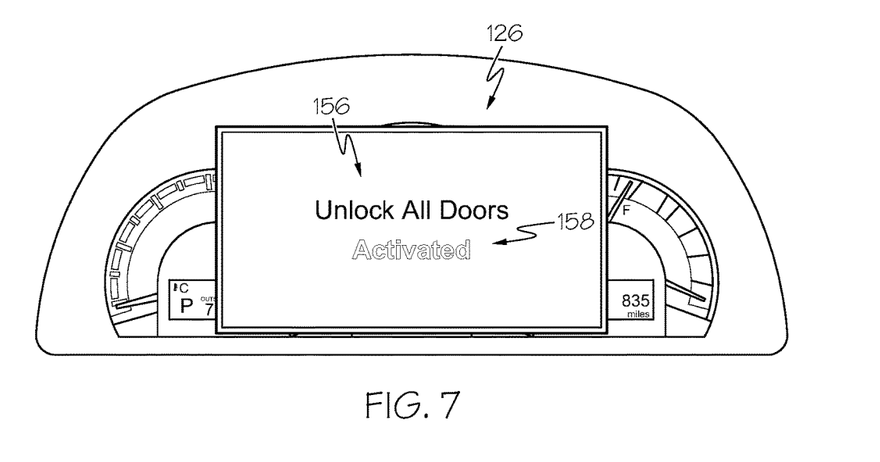
FIG. 7 is a front view of another exemplary instrument cluster assembly including a transparent display overlay system according to one or more embodiments described herein.

While warning lamps and symbols providing general indicator information and their associated specific indicator information are described above, the transparent display overlay system may provide other information. Referring to FIG. 7 as an example, an image 156 may be provided using the overlay display 126 containing specific information 158 regarding current or adjusting vehicle settings. For example, FIG. 7 illustrates an "Unlock All Doors" vehicle setting as being activated. In some embodiments, one or more images may be displayed as step-by-step instructions regarding changing or adjusting vehicle settings. As an example, instructions may be displayed for changing language settings, unit settings, window lock settings, collision warnings, blind spot monitoring, cruise control settings, driver alert settings, remote key settings, turn signal settings, remote starter settings, headlamp settings, Bluetooth® pairing of new devices, door lock/unlock conditions, etc.

The above-described transparent display overlay systems provide additional display and information to an operator dynamically with a transparent display layer affixed directly to a transparent protective cover of an instrument cluster assembly. The transparent display layer may be formed of an AMOLED that provides transparency when its pixels are not activated, which allow the operator to view the vehicle instruments therethrough. Since the transparent display layer is spaced from the vehicle instruments, a three-dimensional-like image can be displayed that appears to interact with the underlying instruments, lamps, etc. Overlaying the additional specific information can improve menu structure and aid in setup of various vehicle settings and customizable features. While analog vehicle instruments are described above, the vehicle instruments may be digital and formed by a display system.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An instrument cluster assembly for a vehicle, the instrument cluster assembly comprising:
   an instrument panel comprising a vehicle instrument that is viewable by an occupant of the vehicle, the instrument panel displaying general indicator information regarding an internal operation condition of the vehicle;
   a transparent protective cover that covers and encloses the vehicle instrument such that the vehicle instrument and the general indicator information are viewable by the occupant through the transparent protective cover;
   a transparent display overlay system comprising:
     an overlay display comprising an active transparent display layer connected to the transparent protective cover by an optical adhesive layer; and
     a display controller that selectively displays an image comprising specific indicator information on the active transparent display layer with the active transparent display layer activated based on the general indicator information, the specific indicator information supplements the general indicator information, the active transparent display layer generating the image along the transparent protective cover;

wherein the vehicle instrument is viewable by the occupant through the transparent protective cover and the active transparent display layer adjacent the image and the image comprises a directional indicator that points toward the general indicator information visible through the active transparent display layer and the transparent protective cover to provide a visual association from the image to the general indicator information, the general indicator information being at a fixed location on the instrument panel.

2. The instrument cluster assembly of claim 1, wherein the active transparent display layer is spaced from the vehicle instrument in a vehicle lengthwise direction providing a gap between the active transparent display layer and the vehicle instrument.

3. The instrument cluster assembly of claim 1, wherein the vehicle instrument is analog.

4. The instrument cluster assembly of claim 1, wherein the vehicle instrument is digitally displayed.

5. The instrument cluster assembly of claim 1, wherein the instrument panel displaying an illuminated warning indicator symbol comprising the general indicator information only after a vehicle condition is detected.

6. The instrument cluster assembly of claim 5, wherein the image provided only when the illuminated warning indicator symbol is displayed.

7. The instrument cluster assembly of claim 1, wherein the overlay display is an AMOLED type display.

8. The instrument cluster assembly of claim 1, wherein the overlay display provides a touch screen.

9. A method of displaying vehicle information to an occupant of a vehicle, the method comprising:
providing general indicator information to the occupant of the vehicle using an instrument cluster of an instrument cluster assembly, the instrument cluster including a vehicle instrument and a transparent protective cover that covers and encloses the vehicle instrument such that the vehicle instrument and the general indicator information are viewable though the transparent protective cover; and
providing specific indicator information as part of an image associated with the general indicator information to the occupant of the vehicle using an overlay display of a transparent display overlay system, the specific indicator information supplements the general indicator information, the overlay display comprising an active transparent display layer connected to the transparent protective cover by an optical adhesive layer;
wherein a display controller provides the image on the active transparent display layer based on vehicle information only when the general indicator information is displayed, the image comprises a directional indicator that points toward the general indicator information visible through the active transparent display layer and the transparent protective cover to provide a visual association from the image to the general indicator information, the active transparent display layer generating the image along the transparent cover, the general indicator information being at a fixed location on the instrument panel.

10. The method of claim 9, wherein the vehicle instrument is viewable by the occupant through the transparent protective cover and the active transparent display layer adjacent the image.

11. The method of claim 9, wherein the transparent display layer is spaced from the vehicle instrument in a vehicle lengthwise direction providing a gap between the active transparent display layer and the vehicle instrument.

12. The method of claim 9, wherein the step of providing general indicator information includes illuminating a warning indicator symbol.

13. The method of claim 12, wherein the step of providing specific indicator information includes providing a description of the warning indicator symbol as part of the image.

14. The method of claim 9, wherein the overlay display is an AMOLED type display.

15. A method of forming an instrument cluster assembly for a vehicle, the method comprising:
affixing an active transparent display layer of an overlay display to a transparent protective cover with an optical adhesive, the active transparent display layer configured to display an image based on a signal provided by a display controller, the signal being based on vehicle information; and
connecting the transparent protective cover to an instrument cluster thereby covering and enclosing a vehicle instrument of the instrument cluster, the instrument cluster providing general indicator information, the active transparent display layer being spaced from the vehicle instrument in a vehicle lengthwise direction;
wherein the vehicle instrument and the general indicator information are viewable through the transparent protective cover and the active transparent display layer with the transparent protective cover connected to the instrument cluster, the active transparent display layer generating the image along the transparent protective cover only when the general indicator information is displayed, the image comprising a directional indicator that points toward the general indicator information visible through the active transparent display layer and the transparent cover to provide a visual association from the image to the general indicator information, the general indicator information being at a fixed location on the instrument panel;
wherein the image providing specific indicator information as part of the image that is associated with the general indicator information, the specific indicator information supplements the general indicator information.

16. The method of claim 15, wherein the overlay display is an AMOLED type display.

17. The method of claim 16 comprising providing the active transparent display layer with a touch digitizer layer for providing a touch screen.

18. The method of claim 15, wherein the active transparent display layer covers at least about 50 percent of an interior surface area of the transparent protective cover.

19. The method of claim 15, wherein the vehicle instrument is analog.

20. The method of claim 15, wherein the step of providing general indicator information includes illuminating a warning indicator symbol on the instrument cluster.

* * * * *